United States Patent
Spisak

[11] 3,758,744
[45] Sept. 11, 1973

[54] CLUTCH MECHANISM FOR WELDING TOOLS

[75] Inventor: Steve Spisak, Elyria, Ohio

[73] Assignee: TRW Inc., Cleveland, Ohio

[22] Filed: July 19, 1972

[21] Appl. No.: 273,226

[52] U.S. Cl. .................................. 219/98, 219/110
[51] Int. Cl. ............................................. B23k 11/14
[58] Field of Search ........................ 219/98, 110, 90

[56] References Cited
UNITED STATES PATENTS

| | | | |
|---|---|---|---|
| 2,796,513 | 6/1957 | Kelemen et al. | 219/98 |
| 3,244,854 | 4/1966 | Bulli et al. | 219/110 X |
| 3,525,846 | 8/1970 | Spisak | 219/98 |
| 3,445,619 | 5/1969 | Kelemen | 219/98 |
| 2,265,169 | 12/1941 | Hughes et al. | 219/98 |

*Primary Examiner*—J. V. Truhe
*Assistant Examiner*—B. A. Reynolds
*Attorney*—Allen D. Gutchess, Jr.

[57] ABSTRACT

This is a mechanism for achieving constant lift. The device comprises three basic elements: a stud holder, a lift-imparting member, and a connecting member in which the connecting member has several movable balls trapped therein, the stud holder has a rod reciprocating within the connecting member urging the balls outwardly and the lift-imparting member circumscribes the connecting member and has an inner chamfered surface which on movement engages against the balls and connects the lift-imparting member with the stud holder.

8 Claims, 4 Drawing Figures

PATENTED SEP 11 1973 3,758,744

CLUTCH MECHANISM FOR WELDING TOOLS

BACKGROUND OF THE INVENTION

This invention relates to an apparatus for welding a stud to a workpiece and more particularly to a welding gun adapted to apply a constant lift to a stud.

In a typical welding cycle using the drawn arc method, the stud is inserted into the chuck of the gun, either manually or through the use of a feed mechanism, in a manner which positions it to protrude a short distance beyond a spark shield or ferrule. The stud is then pressed against the workpiece and is moved rearwardly until the forward face of the spark shield or ferrule abuts the workpiece. This initial rearward movement of the stud is referred to in the art as the "plunge" and it must be unimpeded by any outside interference. Current is now applied to the gun apparatus in a circuit including the stud, workpiece, and a coil which cuases the stud to move another distance from the workpiece. This second movement is referred to as the "lift" and is brought about by moving several elements in the lift train, usually through the application of an electromagnetic force. During the lift all the elements of the lift train are required to be immovably attached to each other. During the lift, an electric arc is struck between the stud and the workpiece, while the arc is still operative the stud is allowed to freely move forward to plunge against the workpiece completing the weld.

Early stud welding guns used a solenoid for actuating a core which was attached to the stud holder by a one-way clutch mechanism. When the stud holder was moving toward the core and the core was stationary or moving toward the stud holder relatively free movement was allowed between the members. However, if the core moved away from the stud holder the clutch locked the two members together. A stop was provided which operated on the core and thereby controlled the movement of the core and the amount of lift. This type of arrangement rendered the lift independent of the plunge. The arrangement also introduced variations in the lift effecting the reliability of the welds. One of the reasons for the lift variation was due to the overtravel of the stud holder at the end of the lift.

An improved clutch mechanism is disclosed in the U.S. Pat. to P. A. Glorioso, No. 3,532,851, issued Oct. 6, 1970. This device uses a lifting hook which is attached to the core and which is positioned to engage a lifting ring through which the lifting rod passes. At first the lift rod can pass through the lifting ring unimpeded but when the lifting hook engages the lifting ring, the ring moves to a position in angular relation to the lift rod engaging the lift rod and effectively locking it to the movement of the core.

Another mechanism for achieving constant lift is disclosed in the U.S. Pat. to Kelemen, et al., No. 2,796,513 issued June 18, 1957. The operating mechanism consists of a stud holder 22 and a lifting member 26 which are joined together by a connection member 24. The connecting member comprises a cup-like ball engaging barrel 28 attached to the stud holder 22 having an internal diameter within which a cylindrical ball cage 38 is fitted. The ball cage has recesses trapping several balls around the periphery thereof and the lifting member is fitted within the ball cage. A conical ball engaging member 44 is attached to the end of the lifting member so that movement of the lifting member away from the stud holder causes the ball engaging member to urge the balls outwardly against the inner surface of the ball engaging barrel effectively connecting the stud holder and the lifting member.

SUMMARY OF THE INVENTION

The device disclosed herein comprises a stud holder and a lift-imparting member, both slidably mounted in a housing in a substantially coaxial relationship, and a connecting member. The connecting member includes a tubular ball retainer portion which has several recesses spaced around its periphery within which ball bearings are trapped. A lifting rod of the stud holder is fitted within the central aperture of the ball retainer and into a central hole in a cup-like portion of the lift-imparting member which has an inner shamfered surface. When the lift-imparting member is moved away from the stud holder, the inner chamfered surface bears against the ball bearings forcing them against the lifting rod which is attached to the stud holder thereby effectively connecting the stud holder to the lift-imparting member.

It is an object of the present invention to provide a stud welding gun having means for rendering the lift of a gun independent of plunge.

Another object of the present invention is to provide connecting means which places the stud holder and the lift mechanism in coaxial relation and provides a positive lock between them at a predetermined point in the lift cycle.

DESCRIPTION OF THE PREFERRED EMBODIMENT

Figure 1:
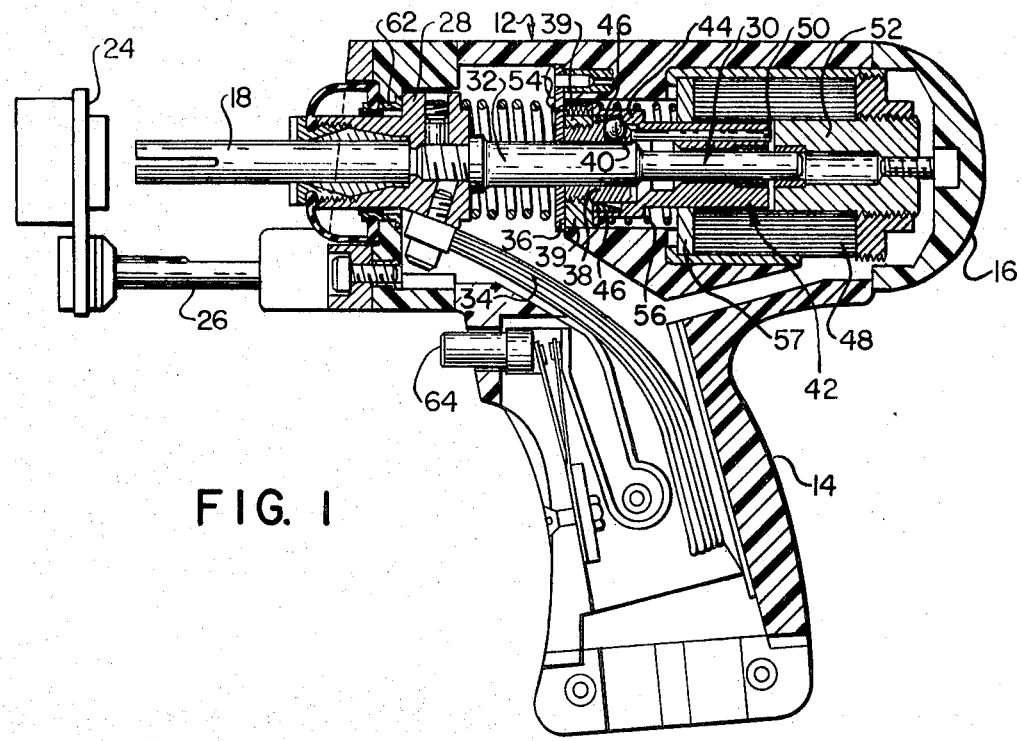
FIG. 1 is a cross section of a welding gun showing the new ball lift mechanism.
Figure 2:
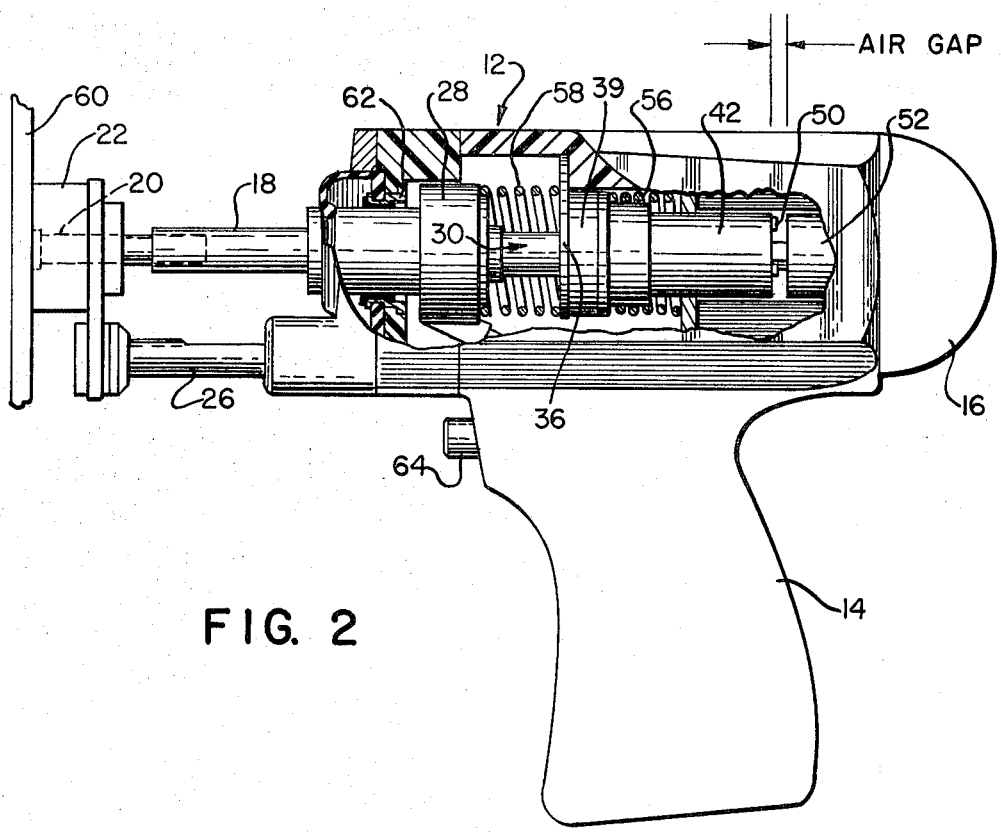
FIG. 2 is an elevation partly in section showing the welding gun after the plunge move.

Referring to the drawings and particularly FIGS. 1 and 2, there is shown a welding tool including main body or housing 12 of suitable dielectric material, the body having a pistol grip 14 and a separable rear end cap 16 and a forward stop 62. A chuck 18 is located at the front end of the tool and holds a stud 20 during the welding operation. The chuck 18 in this instance is surrounded by a ferrule 22 which is held by a supporting foot 24. If desired a permanent spark shield could be used in place of the ferrule.

The supporting foot 24 is adjustably held by two legs 26 in a manner well known in the art.

The chuck 18 is attached to a tubular chuck adapter 28 which in turn is attached to a lifting rod or member 30. The lifting rod has a forward portion 32 of larger diameter than a cylindrical rear portion. The chuck adapter 28 and the lifting rod 30 together form the lifting rod assembly and are slidably supported in a forward portion of the body 12. Welding current is supplied by a flexible main welding cable 34 to the chuck 18.

The cavity defined by the body 12 is divided into two chambers by a lift mechanism stop 36 having an aperture formed therein through which the lifting rod 30 is passed. A ball retainer 38 comprises a tubular retainer portion having a series of recesses around its periphery within which hardened steel bearings or clamping elements 40 are entrapped, and a flange portion 39 which is threaded on the ball retainer 38. The retainer portion of the ball retainer 38 circumscribes the forward portion 32 of the lifting rod 30 which is movable therein and the flange portion of the ball retainer 38 is butted against the lift mechanism stop 36.

A movable core 42 comprises a tubular shank portion extending from a cup-like receiver portion 44 having a tapered cup 46 fixed therein circumscribing the ball retainer 38 and the lifting rod 30.

The movable core 42 is retracted when current is supplied to a lifting and holding coil 48 through which it axially extends. The rearward movement of the core 42, which determines the extent of the lift, is limited by the engagement of ball locking pins 50, which extend from channels formed in the shank of the movable core 42 toward the forward end of the adjustable core piece 52.

The lifting rod assembly includes the lifting rod 30 and the chuck adapter 28. The movable core assembly includes the movable core 42 and the tapered cup 46. Three holes are bored evenly spaced around the flange portion 39 which extends outwardly from the ball retainer 38. A ball locking spring 54 is inserted in each of the holes in the flange portion 39 bearing against the forward edge of the receiver cup-like portion 44 of the movable core 42.

The installation of the internal mechanism of the gun places the movable core assembly in circumscribing relation to the ball retainer 38 with the ball locking pins 50 extending rearwardly from the end of the movable core 42, and the ball locking springs 54 butted against the forward edge of the cup-like portion 44. A movable core spring 56 is trapped between the movable core 42 and a coil yoke 57 which butts against the lifting and holding coil 48. A plunge spring 58 is then installed followed by the lifting rod assembly which extends through the ball retainer 38 and the movable core assembly. The lifting rod assembly is held in the extreme forward positiion by the plunge spring 58 with the movable core assembly held in its extreme forward position by the movable core spring 56. To insure constant release of the lifting rod 30 the movable core spring 56 must overcome the combined pressures of the three ball locking springs 54.

In the free position all components of the gun are in abutment against their respective stops with the stud 20 protruding beyond the ferrule 22. FIG. 2 shows the gun in the welding position with the ferrule 22 against a workpiece 60 and with the end of the stud in the same plane as the forward edge of the ferrule 22.

When the stud 20 is passed against the workpiece 60 the lifting rod assembly is moved away from its forward stop 62 an amount equal to the plunge setting which in turn equals the distance between the front wall of the chuck adapter 28 and the forward stop 62. The air gap between the terminal ends of the ball locking pins 50 and the front surface of the adjustable core piece 52 does not change in this stage of the lift cycle. When the lifting and holding coil 48 is energized by the operator pressing the trigger 64, the movable core 42 moves away from the flange portion 39 of the ball retainer 38, compressing the movable core spring 56, thereby allowing the three ball locking springs 54 to maintain a separation between the flange portion 39 of the ball retainer 38 and the movable core 42. This movement of the movable core 42 causes the inner surface of the tapered cup 46 to urge the ball bearings 40 toward the forward portion 32 of the lifting rod 30. Up to this point of ball engagement, the lifting rod assembly has not moved from its pre-set position. However, the air gap between the movable core 42 and the adjustable core piece 52 has been reduced an amount equal to the free travel required to obtain ball engagement with the lifting rod.

Figure 3:
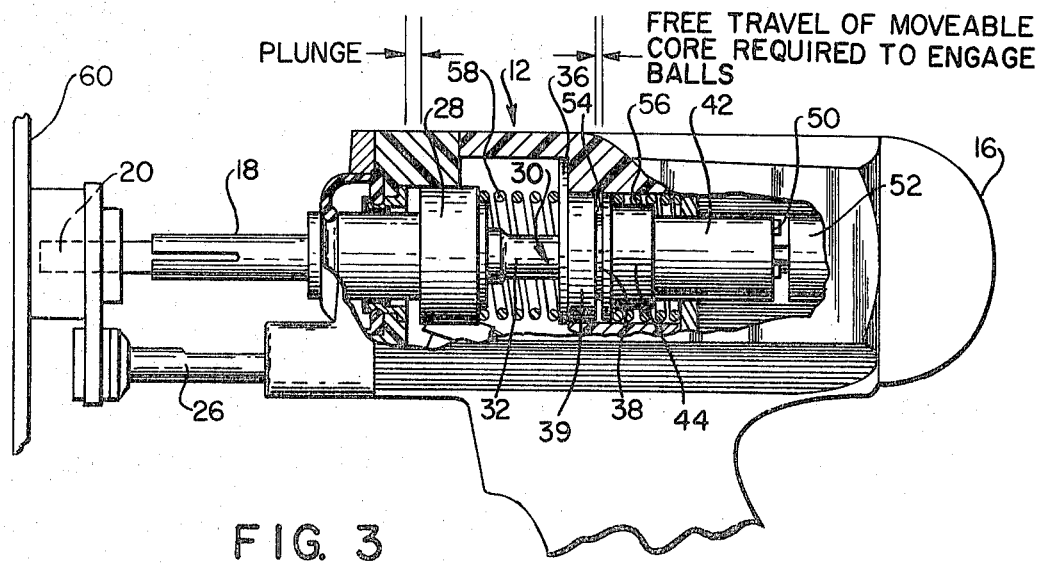
FIG. 3 is an elevation partly in section showing the welding gun after coil energization with the movable core shown at the point of ball engagement with the lifting rod.

FIG. 3 shows the gun after coil energization with the movable core 42 shown at the point of ball engagement with the lifting rod 30. Upon total ball engagement, the lifting rod, ball retainer and movable core assemblies will move as a unit. As the lifting rod assembly is moved rearwardly, the plunge spring 58 is compressed between the lift mechanism stop 36 and the chuck adapter 28.

Figure 4:
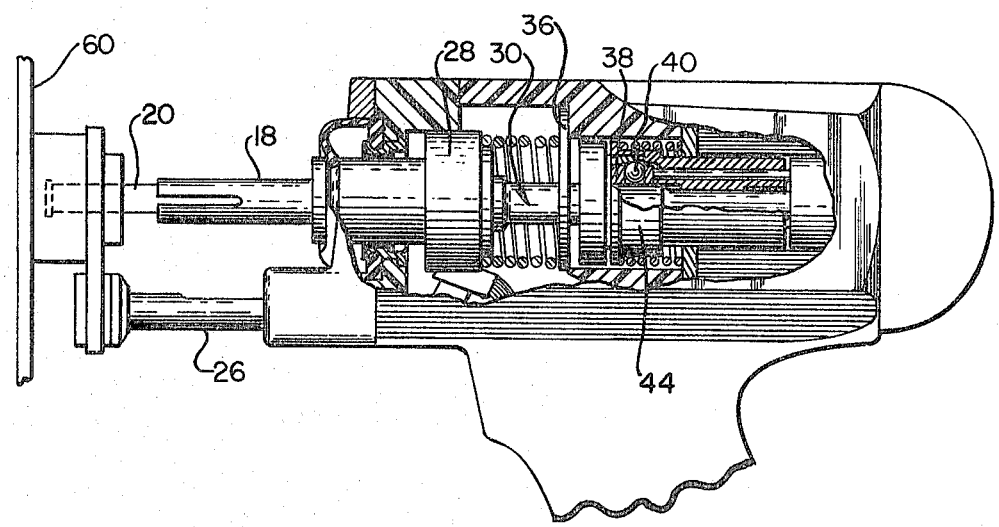
FIG. 4 is an elevation partly in section showing the welding gun in full lift position.

The total lift is determined by the pre-set gap between the free terminal ends of the ball locking pins 50 and the adjustable core 52. FIG. 4 shows the gun in the full lift position. The stud 20 and ball retainer 38 have moved from their respective stops an amount equal to the lift setting. The gap between the lifting rod and rear of the front cover is equal to the plunge distance plus the lift distance.

The advantage of using the locking pins 50 over the old method of using the rear surface of the movable core to act as a lift stop against the adjustable core is that a constant grip is maintained on the lifting rod for the duration of the lift cycle. The locking pins or elements 50, when abutting the adjustable core or stop 52, engage the ball retainer 38 directly to force the balls 40 more fully against the lifting rod portion 32 as the cup-like portion 44 and the tapered cup 46 tend to move further rearwardly by inertia thereby reducing the lifting rod, overtravel assuring a more constant lift.

With reference to the foregoing description it is to be understood that what has been disclosed herein represents an embodiment of the invention and is to be construed as illustrative rather than restrictive in nature and that the invention is best described by the following claims.

I claim:

1. A lift mechanism for a welding tool comprising a lifting rod, a ball retainer positioned around a portion of said lifting rod and having a recess therein, a ball in said recess and adapted to engage the surface of said lifting rod, a movable core to the rear of said ball retainer and having a cup-like portion extending around said ball retainer, means forming a tapered inner surface on said cup-like portion facing rearwardly to engage said ball and force it against said lifting rod when said core is moved rearwardly, an electrical coil for moving said movable core rearwardly when energized, an adjustable core stop located rearwardly of said movable core, and a locking pin in said movable core having an end extending rearwardly therefrom and adapted to engage said adjustable core stop, the forward end of said locking pin being engageable with said ball retainer to prevent further rearward movement of said ball retainer when said locking pin engages said adjustable core stop.

2. In a stud welding tool, a housing, a chuck extending forwardly of said housing and mounted for movement in lift and plunge directions, a chuck adapter connected with said chuck at the forward end of said housing, means normally biasing said chuck and said adapter in the plunge direction, a lifting member connected with said chuck adapter and extending rearwardly therefrom, a clamping element retainer around a portion of said lifting member, a movable core located rearwardly of said retainer and having an annular wall extending therearound with an inner, slanted surface, a clamping element held by said retainer and engageable by said slanted surface to move said element against said lifting member when said core is moved rearwardly, means biasing said movable core in a plunge direction to move said inner, slanted surface away from said clamping element whereby said lift rod can move in a lift direction free of said clamping element, means effective to move said movable core in a lift direction, and stop means for limiting the movement of said movable core in the lift direction.

3. A welding tool according to claim 9 characterized by an elongate locking element carried by said movable core and extending rearwardly thereof, said locking element being effective to engage said stop means and to simultaneously engage said retainer to stop movement of said retainer in a lift direction and cause said inner, slanted surface to further urge said clamping element toward said lifting member when said movable core tends to move further in the lift direction.

4. A weld tool according to claim 2 characterized by said lifting member extending centrally completely through said movable core and into said stop means.

5. A lift mechanism for a welding tool comprising a lifting rod, a clamping element retainer positioned around a portion of said lifting rod and having a recess therein, a clamping element positioned in said recess and having an inner portion adapted to extend inwardly from said retainer to engage the surface of said lifting rod, said clmaping elment also having another portion extending outwardly beyond said retainer, a movable core positioned to the rear of said retainer and having a cup-like portion extending around said retainer, means forming a tapered inner surface on said cup-like portion facing rearwardly to engage said clamping element and force it against said lifting rod when said movable core is moved rearwardly, electromagnetic means for moving said movable core rearwardly, when energized, stop means located rearwardly of said movable core, and a locking pin in said movable core having an end extending rearwardly therefrom and adapted to engage said stop means, a forward end of said locking pin being engageable with said retainer to prevent further rearward movement of said retainer when said locking pin engages said stop means.

6. A lift mechanism according to claim 5 characterized by said clamping element being of spherical shape.

7. A lift mechanism according to claim 5 characterized by said retainer having a plurality of the recesses located therearound, there being a plurality of said clamping elements in said recesses, and additional locking pins carried by said movable core for engaging said retainer.

8. In a stud welding tool, a housing, a chuck extending forwardly of said housing and mounted for movement in lift and plunge directions, means biasing said chuck in the plunge direction, lifting means connected with said chuck and extending rearwardly therefrom, a ball retainer having a plurality of recesses therein, a plurality of balls held by said retainer in said recesses and engageable with said lifting means, a movable core located rearwardly of said retainer and having a slanted surface engageable with said balls to urge said balls against said lifting means when said core is moved rearwardly, stop means for limiting the movement of said movable core in the lift direction, and a plurality of locking pins carried by said movable core and having ends extending rearwardly therefrom and adapted to engage said stop means, the forward ends of said locking pins being engageable with said ball retainer to prevent further rearward movement of said ball retainer when said locking pins engage said stop means.

* * * * *

UNITED STATES PATENT OFFICE
CERTIFICATE OF CORRECTION

Patent No. 3,758,744　　　　　　　　Dated September 11, 1973

Inventor(s) Steve Spisak

It is certified that error appears in the above-identified patent and that said Letters Patent are hereby corrected as shown below:

Column 1, line 18, correct the spelling of "causes".
Column 2, line 15, correct the spelling of "chamfered".
Column 5, line 19, change "9" to --2--.
Column 5, line 37, correct the spelling of "clamping".
Column 5, line 37, correct the spelling of "element".

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents